United States Patent
Panikkar et al.

(10) Patent No.: US 12,309,302 B2
(45) Date of Patent: May 20, 2025

(54) BLOCKCHAIN TWIN ARCHITECTURE FOR SECURE MANAGEMENT OF MULTI-CLOUD COMPUTING ENVIRONMENT

(71) Applicant: Dell Products L.P., Round Rock, TX (US)

(72) Inventors: Shibi Panikkar, Bangalore (IN); Thirumaleshwara Adyanadka Shama, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 17/722,508

(22) Filed: Apr. 18, 2022

(65) Prior Publication Data

US 2023/0336367 A1    Oct. 19, 2023

(51) Int. Cl.
*H04L 9/00* (2022.01)

(52) U.S. Cl.
CPC ..................... *H04L 9/50* (2022.05)

(58) Field of Classification Search
CPC ....................................................... H04L 9/50
See application file for complete search history.

(56) References Cited

U.S. PATENT DOCUMENTS

| | | | | |
|---|---|---|---|---|
| 11,921,703 B2* | 3/2024 | Yang | ............... | G06F 16/2379 |
| 2017/0024260 A1* | 1/2017 | Chandrasekaran | | G06F 9/45558 |
| 2017/0103468 A1* | 4/2017 | Orsini | ............... | G06Q 50/06 |
| 2017/0206532 A1* | 7/2017 | Choi | ............... | G06Q 30/02 |
| 2017/0301047 A1* | 10/2017 | Brown | ............... | G06Q 20/02 |
| 2017/0353309 A1* | 12/2017 | Gray | ............... | G06F 21/51 |
| 2019/0104196 A1* | 4/2019 | Li | ............... | G06Q 20/3823 |
| 2019/0236559 A1* | 8/2019 | Padmanabhan | ......... | H04L 9/3297 |
| 2019/0334726 A1* | 10/2019 | Kelly | ............... | H04L 9/3247 |
| 2019/0334920 A1* | 10/2019 | Kelly | ............... | H04L 9/3239 |
| 2020/0242592 A1* | 7/2020 | Scrivner | ............. | G06Q 20/3672 |
| 2020/0412696 A1* | 12/2020 | Mouring | ............ | H04L 63/1425 |

OTHER PUBLICATIONS

Zhang C, Xu Y, Hu Y, Wu J, Ren J, Zhang Y. A blockchain-based multi-cloud storage data auditing scheme to locate faults. IEEE Transactions on Cloud Computing. Feb. 8, 2021 (Year: 2021).*
NPL Search Terms (Year: 2024).*
A. Cojocaru, "Blockchain for Software License Management," https://www.itassetmanagement.net/2019/05/27/blockchain-for-slm/#:~:text=Using%20a%20Blockchain%20system%20for,fashion%20, May 27, 2019, 8 pages.

(Continued)

*Primary Examiner* — Syed A Zaidi
(74) *Attorney, Agent, or Firm* — Ryan, Mason & Lewis, LLP

(57) ABSTRACT

Techniques for management of a multi-cloud computing environment are disclosed. For example, a method comprises the following steps. A node is configured to participate in a distributed ledger protocol with one or more other nodes. The node is further configured to maintain, in conjunction with the one or more other nodes, a data structure of blocks, wherein the blocks represent one or more of elements and operations associated with a multi-cloud computing environment and collectively function as a digital representation of the multi-cloud computing environment.

20 Claims, 12 Drawing Sheets

(56) References Cited

OTHER PUBLICATIONS

Y. Khatri, "Software License Management on a Blockchain Platform," https://www.coindesk.com/accenture-puts-software-license-management-on-a-blockchain-platform, Nov. 12, 2018, 5 pages.

Satoshi Nakamoto, "Bitcoin: A Peer-to-Peer Electronic Cash System," http://bitcoin.org/bitcoin.pdf, 2008, 9 pages.

J. Frankenfield, Investopedia, "Blockchain-as-a-Service (BaaS)," https://www.investopedia.com/terms/b/blockchainasaservice-baas.asp, May 17, 2018, 8 pages.

L. Fortney, Investopedia, "Blockchain Explained," https://www.investopedia.com/terms/b/blockchain.asp, Nov. 26, 2019, 23 pages.

Wikipedia, "Blockchain," https://en.wikipedia.org/wiki/Blockchain, Jul. 4, 2021, 28 pages.

Google, "Hybrid and Multi-cloud Architecture Patterns," https://cloud.google.com/architecture/hybrid-and-multi-cloud-architecture-patterns, Sep. 20, 2018, 18 pages.

* cited by examiner

BLOCKCHAIN TWIN ARCHITECTURE FOR SECURE MANAGEMENT OF MULTI-CLOUD COMPUTING ENVIRONMENT

FIELD

The field relates generally to information processing systems, and more particularly to secure management of an information processing system comprising a multi-cloud computing environment.

BACKGROUND

A multi-cloud computing environment is a computing environment comprising two or more cloud platforms, e.g., two or more public clouds, two or more private clouds, and/or combinations of public and private clouds (e.g., hybrid clouds). As is known, public clouds are managed by third party vendors (i.e., public cloud service providers), while private clouds are managed by enterprises. These enterprises may also be customers of the third party vendors of public clouds with respect to services provided thereby. Further, there are also vendors that provide multi-cloud operation solutions (i.e., multi-cloud service providers).

Multi-cloud operation provides customers freedom from vendor lock-in when developing and deploying application programs (e.g., workloads) to be executed in the multi-cloud computing environment. Conventional multi-cloud management typically adopts a continuous integration/continuous deployment (CI/CD) pipeline approach (with various scripts such as, but not limited to, terraform and ansible) with centralized data storage for workload management and sharable storage for security keys for multi-cloud integrations. In the CI/CD pipeline approach, an automated pipeline builds code, runs tests, and deploys a new version of an application, thereby removing manual errors, providing standardized feedback loops to developers, and enabling quick application iterations. However, conventional multi-cloud operation still poses significant technical problems with respect to management of application workloads wherein a conventional system lacks an overall accurate snapshot of different workloads in various clouds (i.e., multi-cloud) at a given time and also lacks secure tracking of various workload movements between clouds.

SUMMARY

Illustrative embodiments provide techniques for management of a multi-cloud computing environment. For example, in one illustrative embodiment, a method comprises the following steps. A node is configured to participate in a distributed ledger protocol with one or more other nodes. The node is further configured to maintain, in conjunction with the one or more other nodes, a data structure of blocks, wherein the blocks represent one or more of elements and operations associated with a multi-cloud computing environment and collectively function as a digital representation of the multi-cloud computing environment.

In one or more illustrative embodiments, the multi-cloud computing environment may comprise at least one of a multi-cloud service platform and two or more cloud platforms. Further, the node may be configured to participate in one or more of: establishing one or more unique identities for one or more services provided within the multi-cloud computing environment; generating a workload to be executed by the one or more services within the multi-cloud computing environment; provisioning the workload to the one or more services within the multi-cloud computing environment; and moving the workload to execute on another service within the multi-cloud computing environment.

Advantageously, illustrative embodiments enable secure management and an end-to-end view of workloads within a multi-cloud computing environment.

These and other illustrative embodiments include, without limitation, apparatus, systems, methods and computer program products comprising processor-readable storage media.

DETAILED DESCRIPTION

Figure 1:
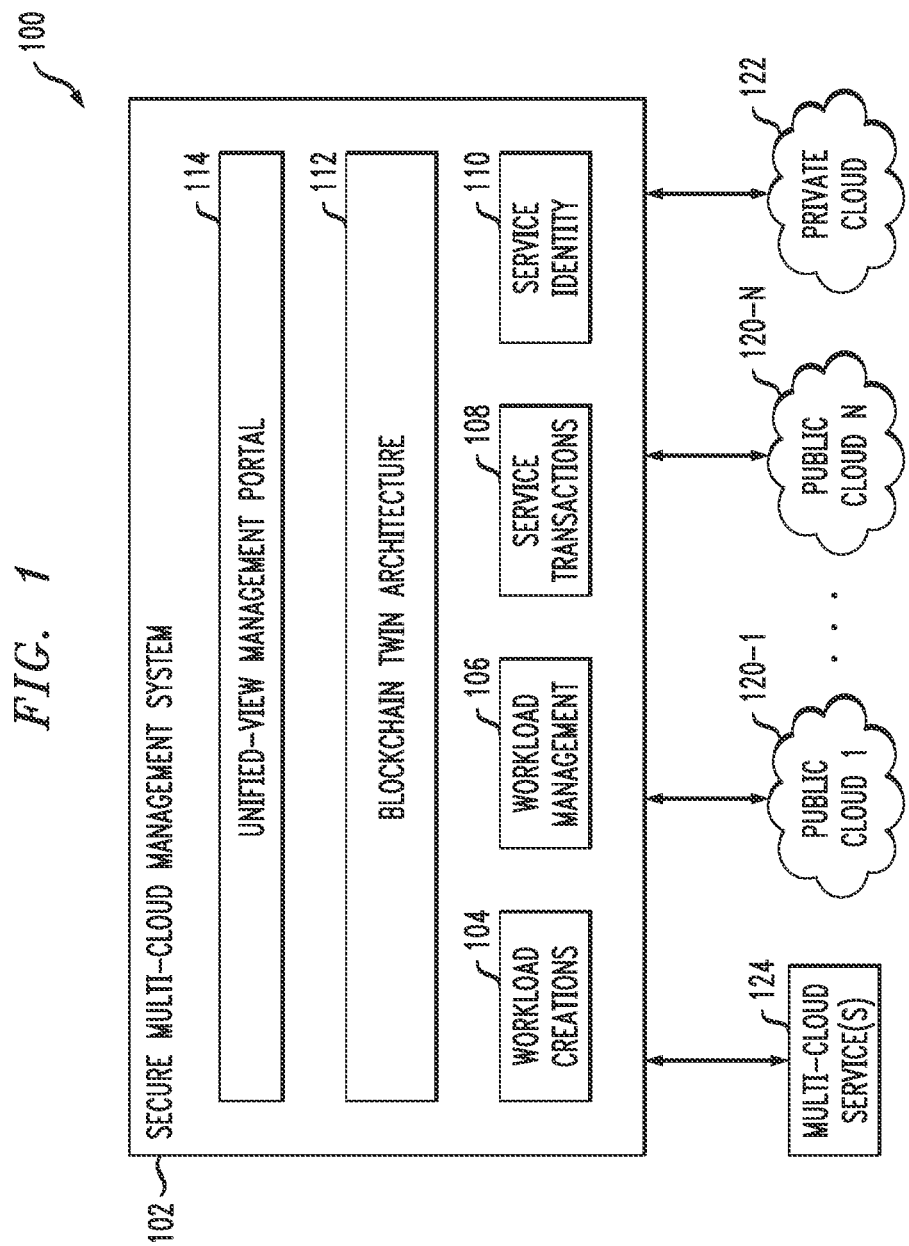
FIG. 1 illustrates a secure multi-cloud management system environment according to an illustrative embodiment.

Given the use of a CI/CD pipeline approach, it is realized herein that conventional multi-cloud operation imposes technical problems with respect to security/trust of workloads and transactions, as well as dependency mapping across various workloads and components. Furthermore, due to a lack of transparency and traceability of an enterprise customer's transactions within a multi-cloud computing environment, trust results cannot be fully acknowledged by all participants. That is, while enterprises may move to a centralized controlling platform for the multi-cloud management to attempt to control workloads from a centralized place and log transactions, it is realized herein that any user in a business department in the enterprise can still directly deploy a workload in a public cloud without the IT department of the enterprise being aware (such non-IT managed deployments are sometimes referred to as shadow IT). Thus, the trust factor between the IT and different departments and service providers is in question. This leads to the inability for the enterprise to have a complete operational view of its workloads, and thus creates a lack of workload and transaction security.

More particularly, there are several major trust risks in the existing centralized controlling platform approach. For example, the technical problem of users in an enterprise directly spinning workloads in public clouds and through multi-cloud service providers, without the knowledge or oversight of the IT department of the enterprise, leads to diminished opportunities to optimize the overall usage of public clouds and multi-cloud service providers and hence a loss to the enterprise. Further, since there is no strict policy controlling and tracking workloads, the transparency of the state of the workloads in the distributed environment continues as a risk. The lack of transparency leads to a diminished trust factor between stakeholders. Still further, most cloud service providers declare their service level agreements (SLAs), trying to offer a certain degree of commitment to service reliability, security and privacy. However, the descriptions on SLAs are typically vague and abstract. Also, transactions and movement across workloads are not adequately tracked and agreed upon by all parties.

Illustrative embodiments overcome the above and other technical problems by providing a blockchain-based approach to enable a decentralized trust architecture for multi-cloud workload and transaction management. More particularly, such a blockchain-based approach utilizes a blockchain twin concept that, inter alia, represents a current state of a distributed multi-cloud workload and facilitates secured operation of the same by providing features such as traceability of records to ensure integrity, as well as undeniability and security of transaction data. Furthermore, in an illustrative embodiment, the blockchain is the basis for workload creation, creation, movements, and transitions. Each node of the blockchain represents a workload distinguished with attribution for different types of workload (e.g., server, applications, databases, network components, monitors, etc.). Each major transaction (e.g., create, move, remove, upgrade across clouds and virtual machines (VMs)) is governed using a smart contract and controlled, signed, and approved by stakeholders and tracked in the blockchain as a trusted transaction.

Referring initially to FIG. 1, a secure multi-cloud management system environment 100 is depicted according to an illustrative embodiment. As generally shown, secure multi-cloud management system environment 100 comprises a secure multi-cloud management system 102 operatively coupled to a multi-cloud computing environment comprising a plurality of public clouds 120-1, . . . , 120-N (hereinafter referred to collectively as public clouds 120 and individually as public cloud 120), a private cloud 122, and one or more multi-cloud services 124.

Recall as mentioned above, public clouds 120 are managed by third party vendors (i.e., public cloud service providers), examples of which may include, but are not limited to, Amazon AWS, Microsoft Azure, and Google Cloud. Private cloud 122 is internally managed by, or on behalf of, the enterprise (e.g., organization, company, group, person) that deploys it. Multi-cloud services 124 (i.e., service providers that provide multi-cloud operation solutions) may include, but are not limited to, Faction, and Equinix.

As further shown in FIG. 1, secure multi-cloud management system 102 comprises: a set of functional modules comprising workload creations 104, workload management 106, service transactions 108, and service identity 110; a blockchain twin architecture 112; and a unified-view management portal 114, which will each be explained in further detail below.

Blockchain twin architecture 112 implements a blockchain protocol, also referred to as a distributed ledger system. As used herein, the terms "distributed ledger," "blockchain," "digital ledger," and the like, may be used interchangeably. A blockchain or distributed ledger protocol is implemented via a distributed, decentralized computer network of computing resources or computing nodes (or simply, nodes). The nodes are operatively coupled in a peer-to-peer communications protocol. In the computer network, each node is configured to participate in the digital ledger protocol and maintain a blockchain which is a cryptographically secured data structure, record or ledger of data blocks that represent transactions associated with respective elements and/or operations within a given computational environment (e.g., the secure multi-cloud management environment 100). The blockchain is secured through use of a cryptographic hash function. A cryptographic hash function is a cryptographic function which takes an input (or message) and returns a fixed-size alpha numeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. In digital ledger technologies such as blockchain, an underlying consensus algorithm is typically used to validate new transactions before they are added to the digital ledger. Typically, for example, the new transaction entry is broadcast to all or a subset of nodes within the network and inspected. The entry is formally committed to the blockchain when consensus is reached by the recipient nodes that the entry is valid. A key principle of the blockchain is that it is trusted. That is, it is critical to know that data in the blockchain has not been tampered with by any of the nodes in the network (or any other node or party). For this reason, a cryptographic hash function is used. Each resulting hash value is unique such that if one item of data in the blockchain is altered, the hash value changes. It is to be appreciated that the above description represents an illustrative implementation of the blockchain protocol and that embodiments are not limited to the above or any particular distributed ledger implementation. As such, other appropriate processes may be used to securely maintain and add to a set of data in accordance with embodiments of the invention. While one illustrative embodiment utilizes Hyperledger Fabric as the distributed ledger, other distributed ledgers such as, but not limited to, R3 Corda and Ethereum may be employed in illustrative embodiments.

Figure 2:
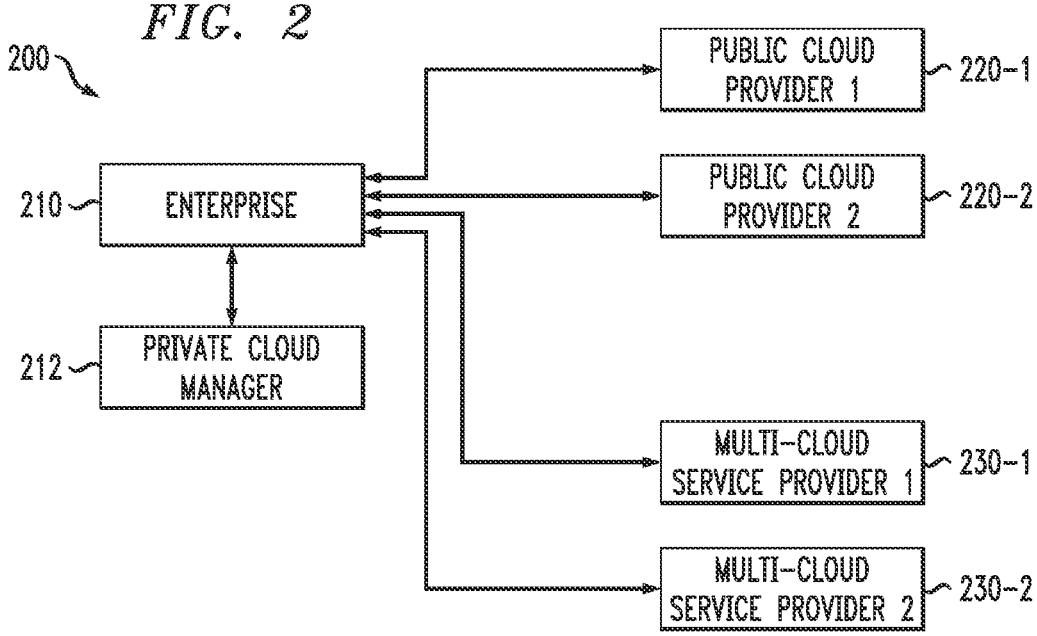
FIG. 2 illustrates exemplary stakeholders in a secure multi-cloud management system environment according to an illustrative embodiment.

Thus, blockchain twin architecture 112 operates based on a permissioned distributed ledger protocol with a set of defined stakeholders. FIG. 2 illustrates a set of main stakeholders 200 according to an illustrative embodiment. As shown, the set of main stakeholders 200 comprises an enterprise 210, a private cloud manager 212, a public cloud provider 220-1 and a public cloud provider 220-2 (hereinafter referred to collectively as public cloud providers 220 and individually as public cloud provider 220), and a multi-cloud service provider 230-1 and a multi-cloud service provider 230-2 (hereinafter referred to collectively as multi-cloud service providers 230 and individually as multi-cloud service provider 230). As mentioned, enterprise 210 may be an organization that utilizes a private cloud, and contracts with providers of one or more public clouds, and one or more multi-cloud services. Private cloud manager 212 is typically internal to the organization (enterprise 210). Public cloud providers 220 may, for example, comprise Amazon, Microsoft, and Google. Multi-cloud service providers 230 may, for example, comprise Faction, and Equinix. Embodiments, however, are not limited to any particular service providers.

Figure 3:
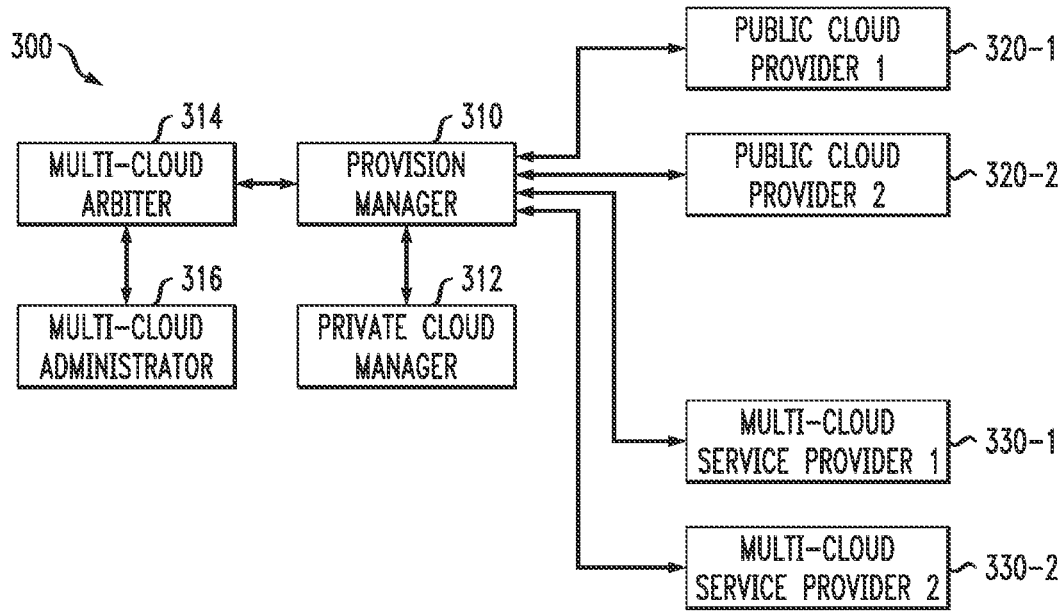
FIG. 3 illustrates exemplary blockchain participants in a secure multi-cloud management system environment according to an illustrative embodiment.

More specifically, the set of main stakeholders 200 corresponds to a set of blockchain actors or participants. FIG. 3 illustrates a set of blockchain participants 300 according to an illustrative embodiment. In one or more illustrative embodiments, each blockchain actor/participant in the figure may represent at least one computing device or node (i.e., a node as described above in the context of a blockchain or distributed ledger system) connected to at least one computing device or node of one or more other participants via a communication channel, as will be further explained herein. As shown in FIG. 3, the set of blockchain participants 300 comprises a provision manager 310, a private cloud manager 312 (also referred to herein as private cloud service provider 312 and private cloud 312), a multi-cloud arbiter 314, a multi-cloud administrator 316, a public cloud provider 320-1, a public cloud provider 320-2, a multi-cloud service provider 330-1, and a multi-cloud service provider 330-2. The number of public and multi-cloud providers shown in FIG. 3 is intended to be an example only, and can include more or less providers in other illustrative embodiments. Likewise, an enterprise may have more than one private cloud and thus may have one or more private cloud managers.

In general, multi-cloud administrator 316 provides management of multi-cloud administrative activities for the enterprise, while multi-cloud arbiter 314 provides approval and control authority functionalities. Provision manager 310 handles workload management and software provisioning, while private cloud manager functions as a provider by managing the private cloud and VM hosted applications of the enterprise. Public cloud providers 320-1 and 320-2 (hereinafter collectively referred to as public cloud providers 320 or individually as public cloud provider 320) can each represent a public cloud provider or a public cloud manager inside the enterprise. Multi-cloud service providers 330-1 and 330-2 (hereinafter collectively referred to as multi-cloud service providers 330 or individually as multi-cloud service provider 330) can each represent a multi-cloud provider or a multi-cloud provider inside the enterprise. Note that while each actor/participant in FIG. 3 represents a node for executing cloud and blockchain functions associated with the actor/participant, it is to be understood that each actor/participant in FIG. 3 can comprise more than one node. By way of example only, public cloud provider 320-1 may comprise one or more nodes for performing cloud operations such as hosting applications and one or more other nodes for performing blockchain operations. Thus, when "a node" is referenced for an actor/participant of FIG. 3, it is intended to mean "at least one node" or "one or more nodes."

Recall from FIG. 1 that secure multi-cloud management system 102 comprises a set of functional modules comprising workload creations 104, workload management 106, service transactions 108, and service identity 110. The following illustrative descriptions explain each of these functional modules in the context of the above blockchain actors/participants of FIG. 3. Note that the functional modules in FIG. 1 do not necessarily refer to functions associated with a single actor/participant in FIG. 3, but may more generally refer to functions associated with one or more actors/participants in FIG. 3. As such, the functional modules will be described below as methodologies involving one or more actors/participants in FIG. 3.

Figure 4:
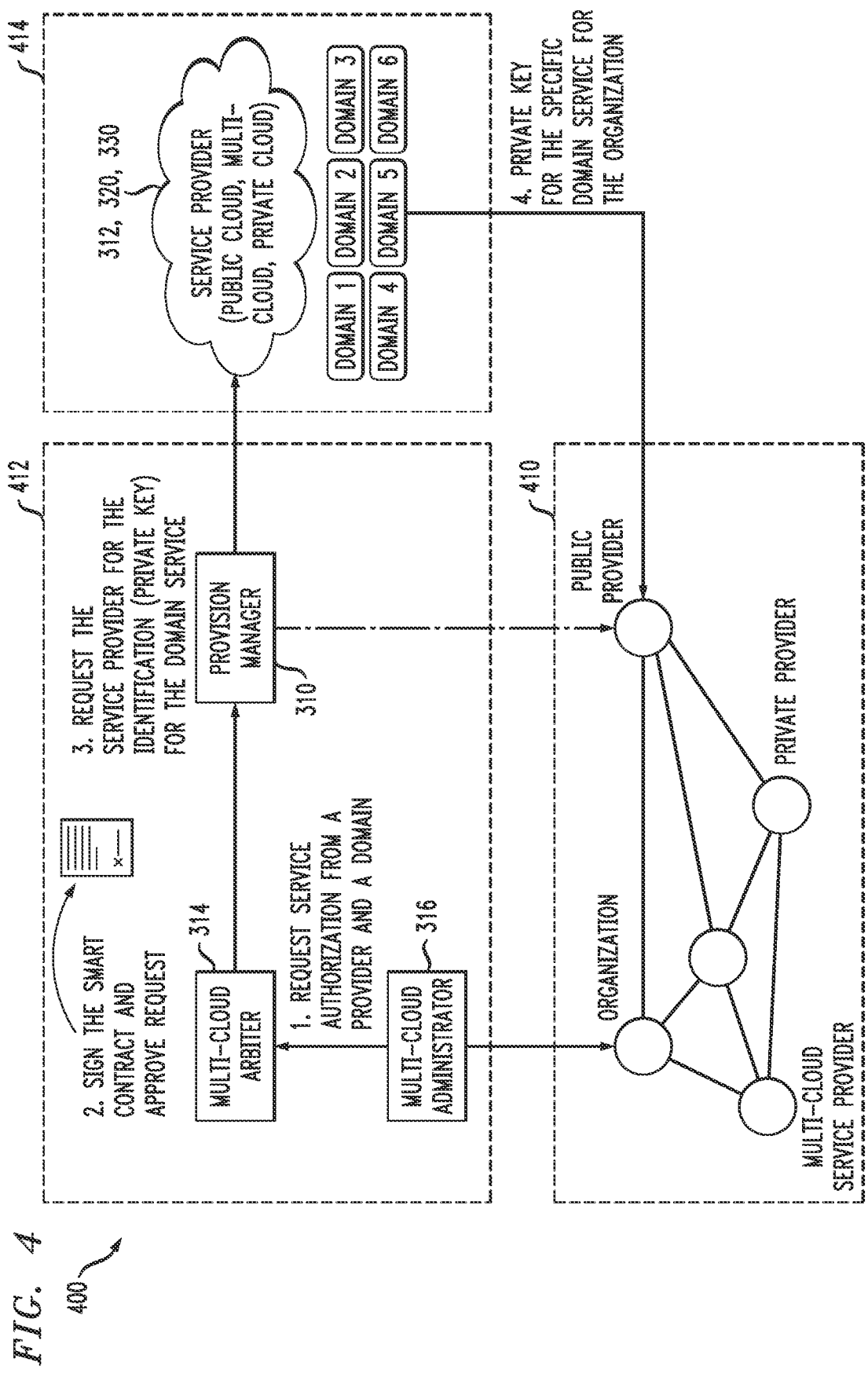
FIG. 4 illustrates a service identity methodology in a secure multi-cloud management system environment according to an illustrative embodiment.

Referring now to FIG. 4, a service identity methodology 400 in a secure multi-cloud management system environment according to an illustrative embodiment is shown. In illustrative embodiments, service identity methodology 400 corresponds to the service identity 110 functional module in FIG. 1. In addition to the blockchain actors/participants from FIG. 3 referenced in FIG. 4, service identity methodology 400 also illustrates an exemplary blockchain twin architecture 410 corresponding to blockchain twin architecture 112 in FIG. 1.

Service identity methodology 400 manages the trust between the enterprise actors/participants (collectively referenced as 412 in FIG. 4) and the service provider actors/participants (collectively referenced as 414 in FIG. 4), as well as controls unauthorized service requests by any users internal or external to the enterprise. Note that the service providers in FIG. 4 comprise public cloud providers (320), multi-cloud service providers (330), as well as private cloud service providers (312). While the enterprise may itself manage a private cloud, for purposes of blockchain twin functionality in illustrative embodiments, a private cloud service provider is handled in a manner similar to public and multi-cloud service providers.

In service identity methodology 400, in general, when the enterprise decides to use a service domain (e.g., Domain1, . . . , Domain6) from one of the service providers 414 (e.g., one of 312, 320, 330), multi-cloud administrator 316 initiates a request. Multi-cloud arbiter 314 approves the request and forwards the request to provision manager 310. Provision manager 310 sends the request to the specified one of the service providers 414 and establishes a secure private key for further transactions and service utilizations. In conjunction with these steps, service identity methodology 400 creates blocks in blockchain twin architecture 410, as will now be further illustratively explained.

More particularly, as shown in FIG. 4, multi-cloud administrator 316 raises a service authorization request from a service provider for a domain (labeled step 1 in FIG. 4). In blockchain twin architecture 410, a new genesis block (e.g., a provider key block) is created for identity.

Multi-cloud arbiter 314 then approves the request in the context of execution of a smart contract (labeled step 2 in FIG. 4). As understood by those ordinarily skilled in the art, a smart contract is a blockchain-based computer program or a transaction protocol (e.g., referred to as chain code) which automatically executes, controls and/or documents relevant events and actions according to the terms of a contract or an agreement.

Thus, once the multi-cloud arbiter 314 signs the request via the smart contract, the genesis block is updated with an "in progress" status in blockchain twin architecture 410. Then, smart contract transactions comprise: (i) approval by provision manager 310; (ii) once approved, the block is updated in blockchain twin architecture 410 with an "approved" status; (iii) attributes required for private key generation are sent (note that the private key is the manner in which the service provider uniquely identifies the requested service domain), and the block in blockchain twin architecture 410 is updated with a "provisioning" status (labeled step 3 in FIG. 4); (iv) the specified service provider generates the private key; (v) the private key in added to the block in blockchain twin architecture 410 (labeled as step 4 in FIG. 4); and (vi) the block in blockchain twin architecture 410 is updated with a "completed" status. Multi-cloud arbiter 314 then signs off on (approves) the update.

Multi-cloud administrator 316 makes the private key block accessible to provision manager 310 (by request or automatically). When a new provisioning request comes for the service provider and domain, provision manager 310 obtains the private key from the block. The service provider can recheck/update the private key according to their security protocol. However, the updated private key block is committed to the blockchain twin architecture only when all parties approve as per the smart contract. As a result, trust is maintained between all blockchain actors/participants. Accordingly, shadow IT or direct users will not have access to the private key and cannot execute the service. This makes the process streamlined to route service availability and provisioning requests through provision manager 310.

To summarize the chain code (e.g., smart contract) lifecycle for service identity methodology 400: (i) multi-cloud administrator 316 creates a genesis block; (ii) multi-cloud arbiter 314 approves and updates the block for provisioning; (iii) provision manager 310 approves and updates the block after sending the request to the service provider (e.g., 312, 320, 330) for provisioning; (iv) the service provider creates the private key (and certificate as needed) for the request for the domain and updates the block; (v) multi-cloud arbiter 314 signs off on the private key update; (vi) chain code is committed to the service provider private channel; and (vii) users are ready to use the identity.

The service provider checks for validity and updates, if required, periodically. In terms of chain code lifecycle, this includes: (i) the service provider checks the domain's private key/certificates, and decides an update is required; (ii) the service provider updates the private key in the block; (iii) the service provider approves multi-cloud arbiter 314; and (iv) the service provider commit in the channel.

Once the identity is established in the blockchain between the enterprise and service provider for a specific service domain, via service identity methodology 400 of FIG. 4, workloads can be created in the service provider. As an illustrative use case, assume Team1 (enterprise) wants to provision a virtual machine (VM) in AWS (Amazon public cloud) and a database (DB) in a private cloud (PC).

Figure 5:
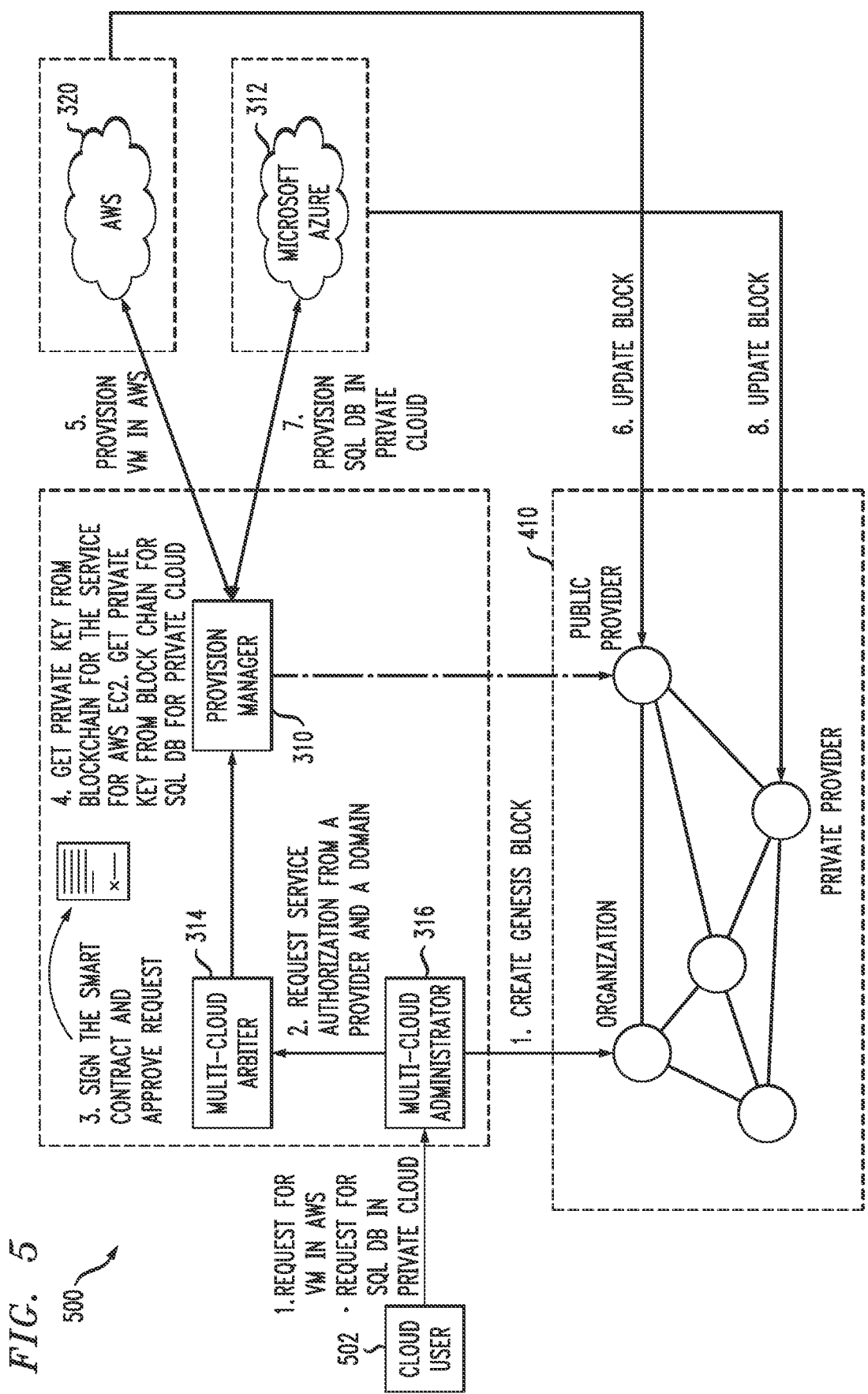
FIG. 5 illustrates a workload creation methodology in a secure multi-cloud management system environment according to an illustrative embodiment.

FIG. 5 illustrates a workload creation methodology 500 in a secure multi-cloud management system environment, according to an illustrative embodiment, which can accommodate this and a wide variety of other illustrative use cases. In illustrative embodiments, workload creation methodology 500 corresponds to the workload creations 104 functional module in FIG. 1. Recall that channels are private communication paths between blockchain actors/participants. For example, in illustrative embodiments, a channel can be between two or more blockchain actors/participants. In workload creation methodology 500, according to one illustrative embodiment, three channels are used and defined as follows:
  (i) Organization-Main Chain-Team1 Block;
  (ii) Organization-AWS Channel-Sub Chain-AWS Block
  (iii) Organization-Private Cloud (PC) Channel-Sub Chain-PC Block Note that blockchain twin architecture 410 uses an intelligent twin blockchain concept such that, once an AWS block and a PC block are committed to the AWS channel (channel (ii) above) and private cloud channel (channel (iii) above), respectively, the Team1 block gets committed to the Team1 channel (channel (i) above).

More particularly, the chain code (smart contract) lifecycle for workload creation methodology 500 is as follows.

In step 1, Team1 user (i.e., cloud user 502) initiates a request with a template that specifies:
  a. Team Name (Team ID within the enterprise/organization);
  b. Request for VM in AWS; and
  c. Request for DB SQL in Private Cloud (PC).

In step 2, multi-cloud administrator 316 creates a genesis block with both requests with the Team1 chain.

In step 3, multi-cloud arbiter 314 approves the request and smart contract transactions initiate in different channels for AWS and Private Cloud (channel AWS, channel PC) with individual requests as child chains with new genesis blocks.

In step 4, provision manager 310 initiates requests for individual chains:
  a. Provision request in block in channel AWS as follows:
    i. Get private key from the AWS key block;
    ii. AWS provisions VM (step 5);
    iii. Update block with status (step 6); and
    iv. Provision manager 310 acknowledges "completeness" and commits to channel AWS.
  b. Provision request in block in channel PC as follows:
    i. Get private key for Private Cloud from PC key block;
    ii. Private Cloud provisions VM (step 7);
    iii. Update block with status (step 8); and
    iv. Provision manger 310 approves and commits to Channel PC.

Figure 6:
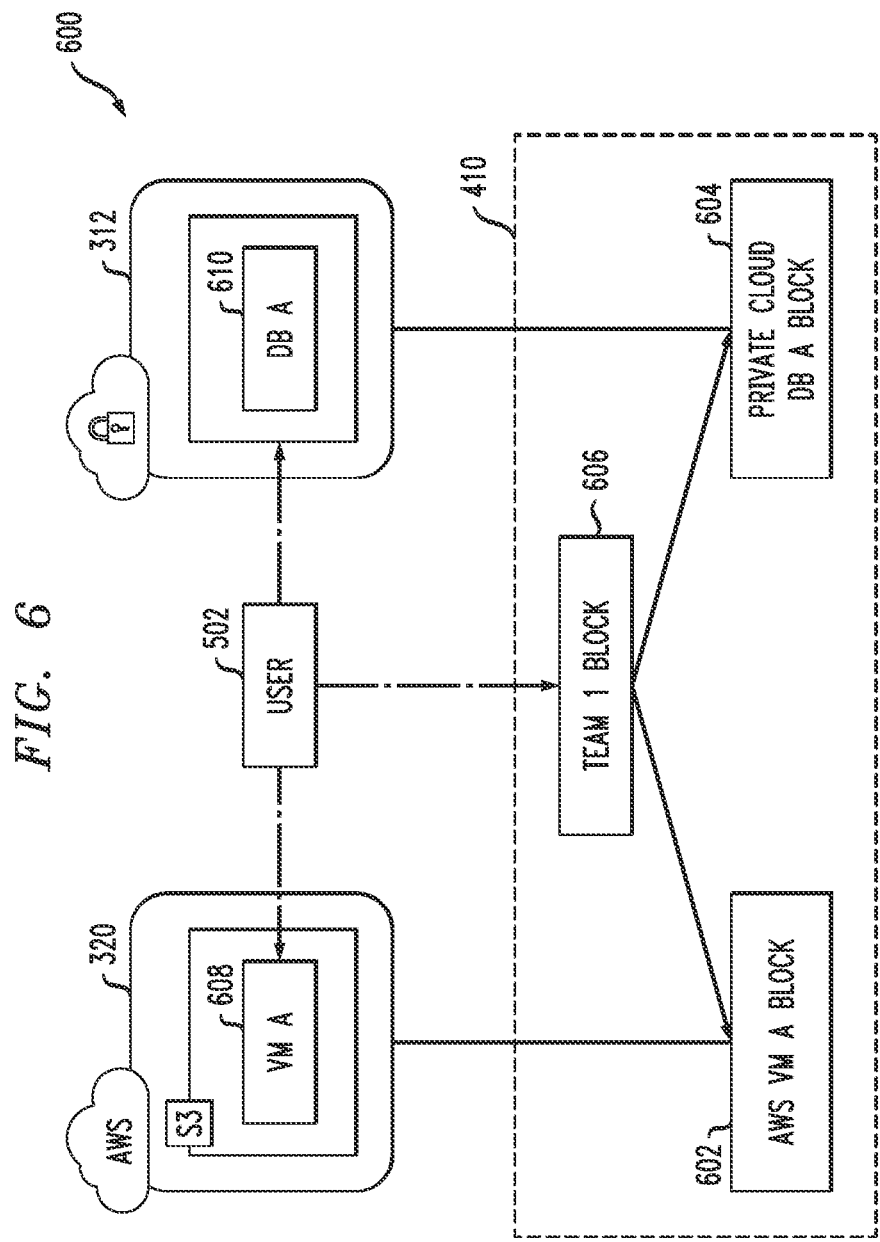
FIG. 6 illustrates an example of a blockchain twin concept in a secure multi-cloud management system environment according to an illustrative embodiment.
Figure 7:
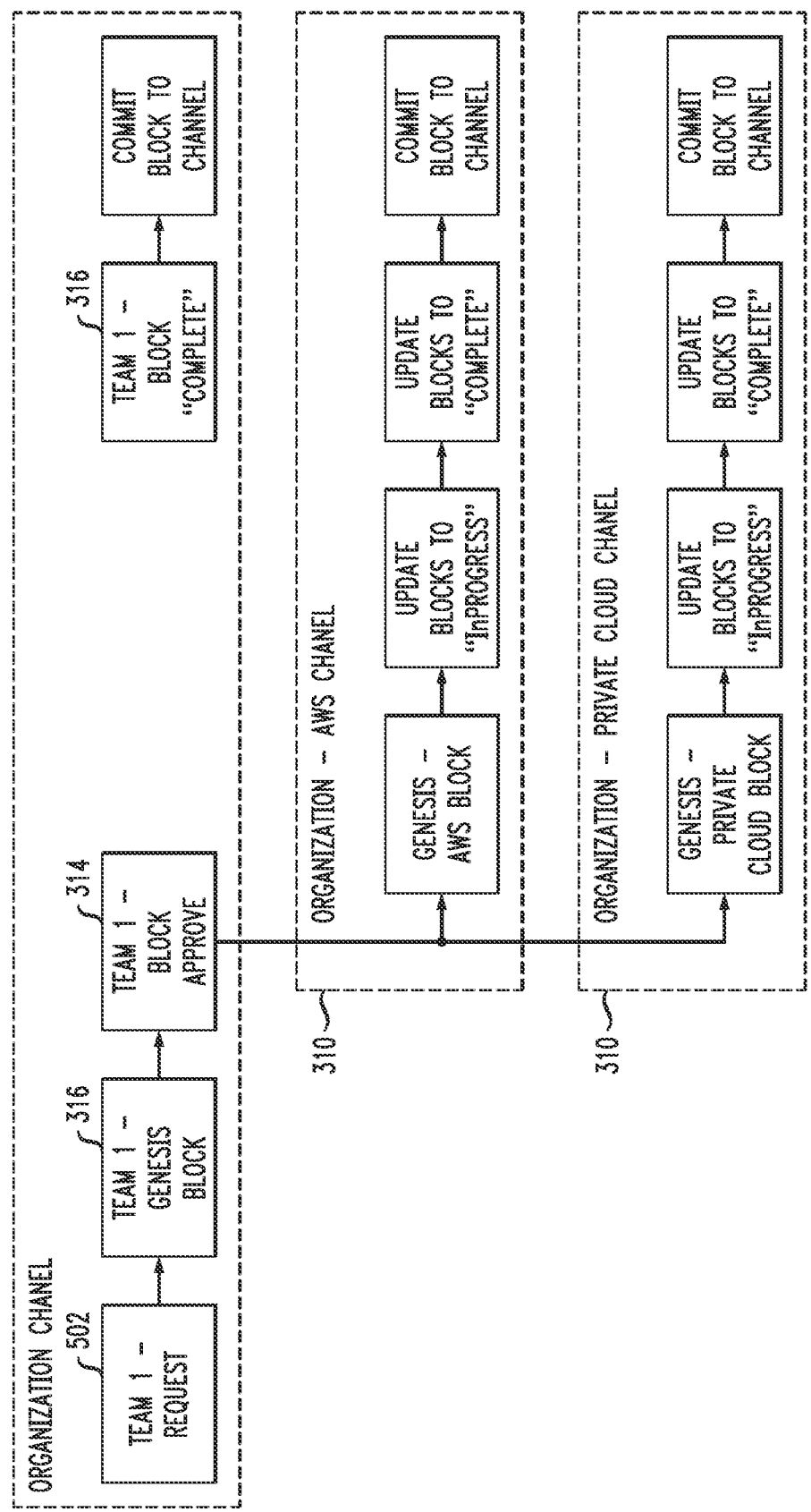
FIG. 7 illustrates a process flow for a blockchain twin in a secure multi-cloud management system environment according to an illustrative embodiment.

As further illustrated in an example 600 of FIG. 6, multi-cloud arbiter 314 acknowledges the commits of child blocks 602 (AWS VM A Block) and 604 (Private Cloud DB A Block), and when both are committed, then commits the parent block 606 (Team1 Block). Once the parent chain code is committed, Team1 is ready to use the VM A (608) in AWS (320) and DB A (610) in PC (312). Note that as used herein in conjunction with the figures, a public cloud such as AWS may use the same reference numeral 320 as a public cloud provider, and a private cloud such as PC may use the same reference numeral 312 as a private cloud provider or manager. One of ordinary skill in the art will fully appreciate when a cloud platform versus a cloud provider or manager is being referenced. FIG. 7 summarizes, as a process flow 700, the above-described blockchain twin-based workload creation methodology 500.

Figure 8:
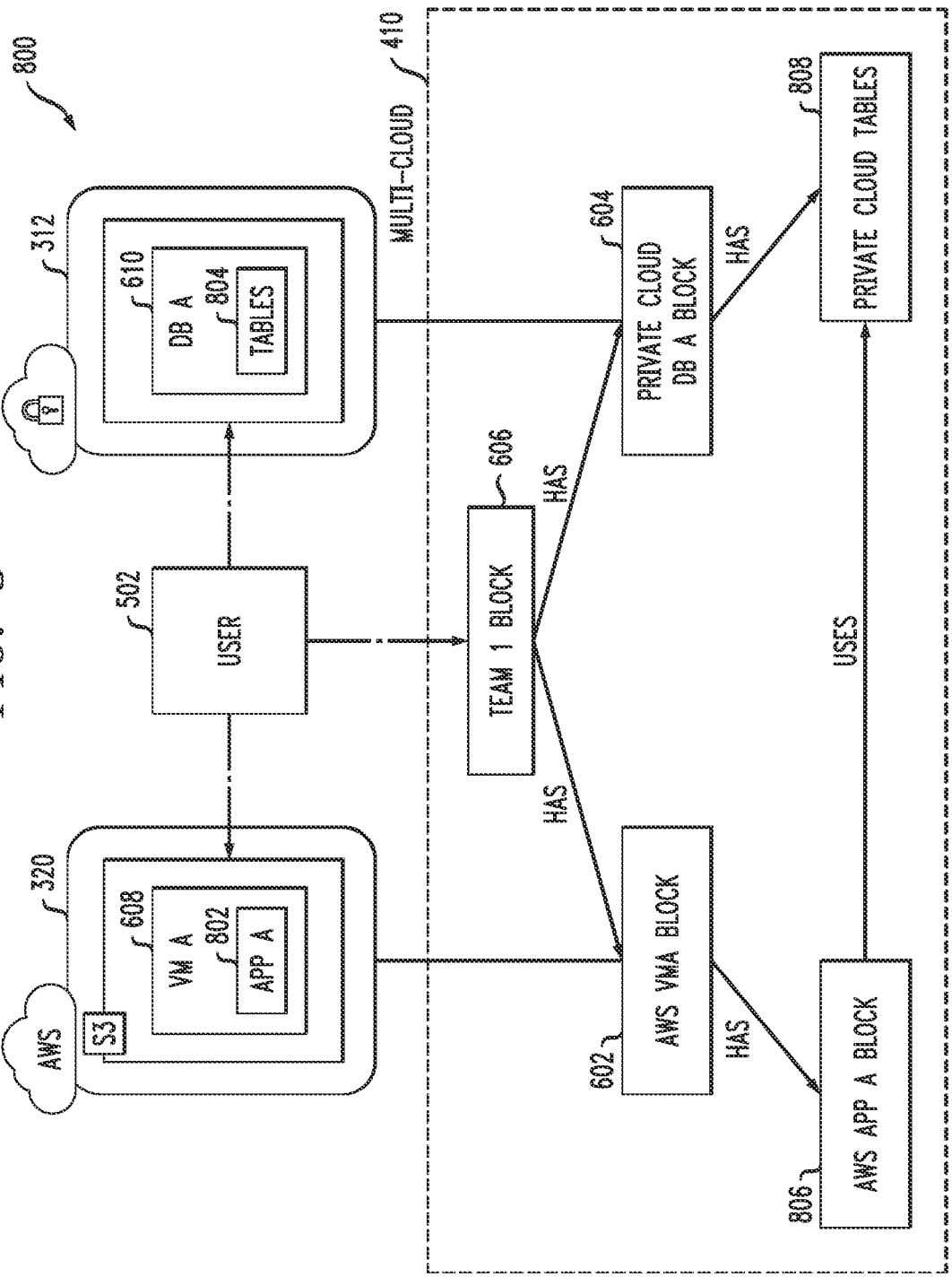
FIG. 8 illustrates a blockchain twin in an application provisioning methodology in a secure multi-cloud management system environment according to an illustrative embodiment.

Turning now to FIG. 8, a workload management methodology 800, according to an illustrative embodiment, is depicted. In illustrative embodiments, workload management methodology 800 corresponds to the workload management 106 functional module in FIG. 1.

Following the use case example 600 in FIG. 6, cloud user 502 (Team1) is now ready to access the VM 608 (VM A in AWS 320) and DB 610 (DB A in private cloud 312), and corresponding blocks 602, 604 and 606 are stored in blockchain twin architecture 410. Next, assume cloud user 502 wishes to deploy an application 802 (App A) in VM 608 that can use one or more tables 804 in DB 610.

Accordingly, further assume that workload management methodology 800 utilizes a CI/CD framework for deploying application 802. Cloud user 502 initiates a request that is approved by multi-cloud arbiter 314 for deploying application 802 in VM 608 and storage in DB 610. Multi-cloud arbiter 314 initiates two genesis blocks: block 806 corresponding to deploying application 802 in VM 608 (AWS 320) and block 808 corresponding to deploying tables 804 in DB 610 (private cloud 312).

As illustrated in blockchain twin architecture 410 in FIG. 8, different relationships are defined between blocks. Note that, in this example, Team1 block 606 maintains a "has" (parent-child) relationship with each of VM A block 602 and DB A block 604. Likewise, VM A block 602 maintains a "has" (parent-child) relationship with App A block 806, while DB A block 604 maintains a "has" (parent-child) relationship with tables block 808. However, App A block 806 maintains a "uses" relationship with DB A block 808. For the "uses" relationship, an attribution in the request block can be: Source: App A; Target: DB A; Relationship: Uses. Thus, with "has" and "uses," relationships are maintained between blocks in blockchain twin architecture 410.

The lifecycle of the corresponding smart contract for the blocks comprises: (i) provision manager 310 approves the corresponding CI/CD scripts, and deploys them in AWS cloud 320 and private cloud 312; and (ii) the blocks are committed as illustrated in FIG. 8 in the corresponding channels.

Figure 9:
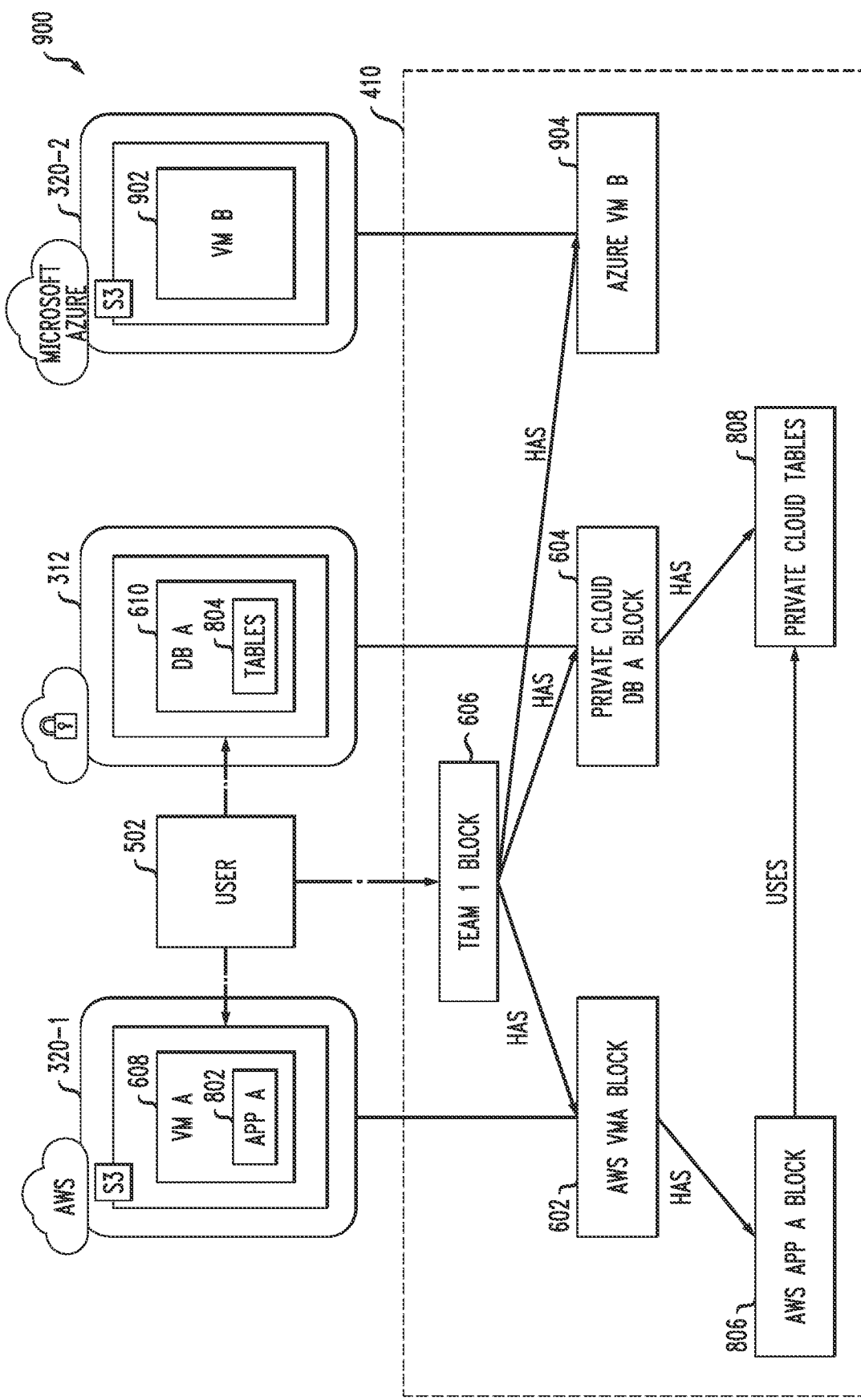
FIG. 9 further illustrates a blockchain twin in an application provisioning methodology in a secure multi-cloud management system environment according to an illustrative embodiment.

Referring now to FIG. 9, assume that workload management methodology 800 of FIG. 8 continues as workload management methodology 900 to further include a second VM (VM B) in a second public cloud (e.g., Azure). Thus, AWS cloud 320 in FIG. 8 becomes 320-1 in FIG. 8, and the Azure cloud is referenced as 320-2 and comprises VM B (VM 902) as shown in FIG. 8. A block 904 is generated in blockchain twin architecture 410 corresponding to Azure VM B in a similar manner as block 602 was generated for AWS VM A.

Figure 10:
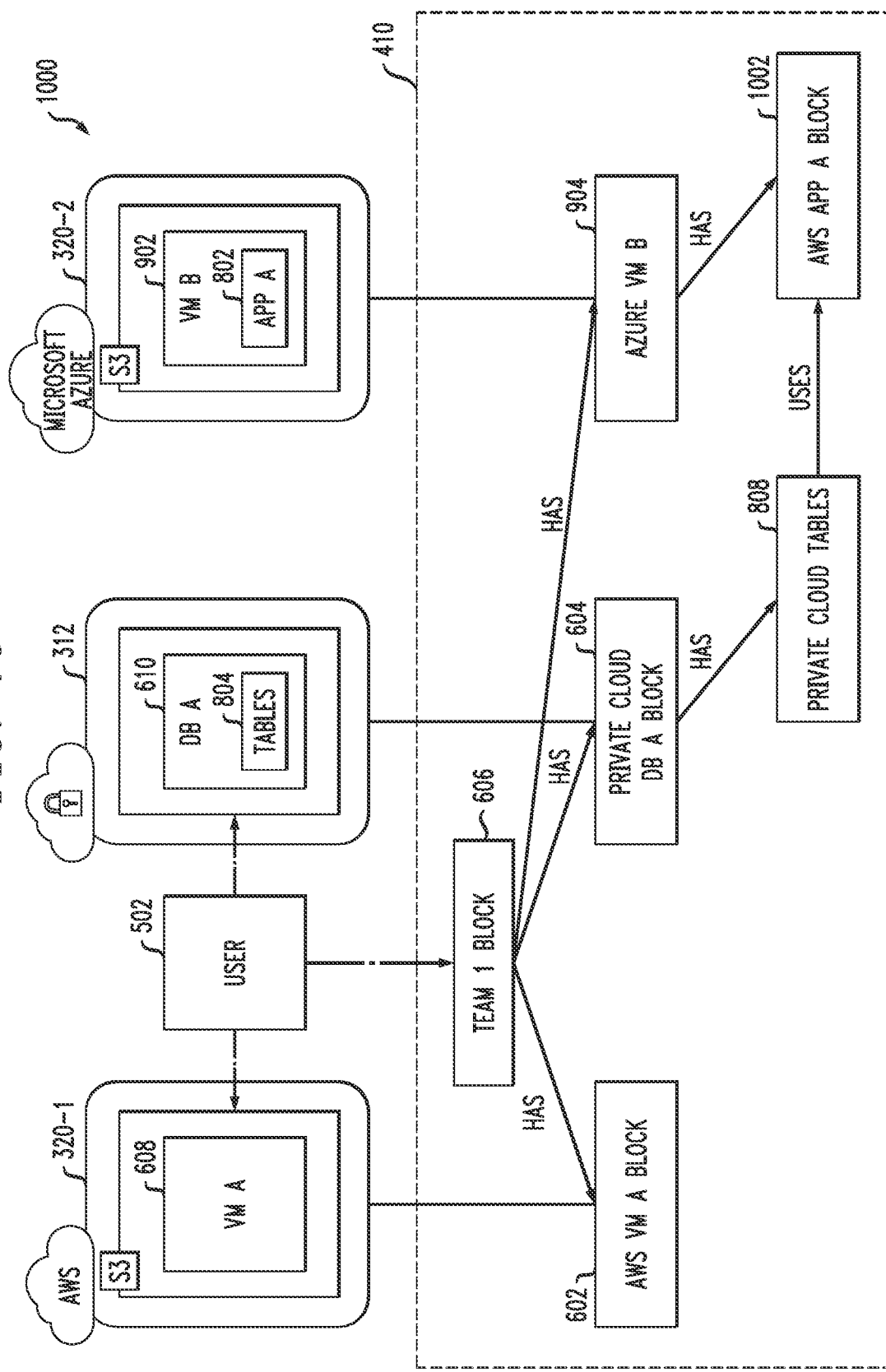
FIG. 10 illustrates a blockchain twin in a workload movement methodology in a secure multi-cloud management system environment according to an illustrative embodiment.

Now assume that cloud user 502 wishes to move App A (802) from executing in AWS VM A (608) to Azure VMB (902). Thus, workload management methodology 900 of FIG. 9 continues as workload management methodology 1000 in FIG. 10.

More particularly, cloud user 502 initiates a request to move App A from AWS cloud 320-1 to Azure cloud 320-2. The smart contract (chain code) lifecycle thus comprises the following steps:
1. Cloud user 502 (Team1) initiates the request with a template including:
   a. Team name (enterprise ID); and
   b. Request for moving App A from AWS cloud to Azure cloud.
2. Multi-cloud administrator 316 creates a genesis block request with Team1 chain.
3. Multi-cloud arbiter 314 approves the request and smart contract transactions are initiated in different channels for AWS and Azure (channel AWS, channel Azure) with individual requests as child chains with new genesis blocks.
4. Provision manager 310 initiates requests for individual channels:
   a. Provision request in a block 1002 in channel Azure (this block will have relationship as <Uses> DB A):
      i. Use CI/CD to deploy App A in Azure cloud;
      ii. Update the block status; and
      iii. Provision manger 310 approves and commits to channel Azure.
   b. Provision request in block in channel PC:
      i. Use Ansible/Terraform script to remove App A from AWS cloud;
      ii. Update AWS App A block (806) with status "removed;"
      iii. Update block status; and
      iv. Provision manger 310 approves and commits to channel AWS.
5. Multi-cloud arbiter 314 acknowledges the commits of the child blocks, and when both are committed, then commits the parent block in Team1 chain.

Once the parent chain code is committed in Team1 chain, the workload movement (App A from AWS to Azure) is completed. As explained above, the blockchain twin concept gives the "has" (parent-child) relationship and the smart contract attribution gives the "uses" relationship. This enables the blockchain twin architecture 410 to represent the entire echo system (multi-cloud computing environment) in the chain of blocks as shown.

It is to be appreciated that Team1 still owns the AWS VM A, even though they moved workload from AWS to Azure. Multi-cloud administrator 316 can terminate the process in conjunction with the approval/disapproval process of multi-cloud arbiter 314. Note that, in some embodiments, cloud user 502 only has a team view within the blockchain twin architecture 410. However, multi-cloud administrator 316 has a view of distributed workloads across the entire organization. Such a full view of the end-to-end workload distributions across the multi-cloud computing environment can be provided, according to some illustrative embodiments, in a graphical user interface (GUI). For example, such a GUI is referenced as unified-view management portal 114 of FIG. 1. Note also that the service transactions 108 functional module is intended to generally represent any transactions that occur with respect to any service provider in secure multi-cloud management system environment 100. Each transaction can be made visible through unified-view management portal 114 to one or more actor/participants.

Accordingly, blockchain twin architecture 410 is considered a data structure of blocks representing one or more of elements and operations of a multi-cloud computing environment such that the data structure functions as a digital twin (i.e., virtual or digital representation) of the multi-cloud computing environment. That is, as shown in FIGS. 6 and 8-10, blocks 602, 604, 606, 806, 808, 904 and 1002 and their interrelationships function as a digital twin of multi-cloud computing environment elements such as DB A in private cloud 312, VM A in public cloud 320-1, VM B in public cloud 320-2, App A, tables in DB A, etc., as well as operations (e.g., service transactions, service identity, workload creation, workload provisioning and workload migration) associated with these and/or other elements. Thus, the terms digital twin, digital representation, blockchain twin, blockchain double, or the like, are intended to be synonymous or otherwise interchangeable with the term blockchain twin architecture (e.g., 112, and 410 in various figures).

Advantageously, such a blockchain twin architecture enables full control over multi-cloud operations, and provides a transparent, yet visible, end-to-end blueprint of the multi-cloud computing environment. The blockchain twin architecture enables enhanced trust among stakeholders in the multi-cloud computing environment and ensures fully secured transactions based on a blockchain with service identity and stakeholder approvals. Security with service level agreements (SLA) between users and service providers is also significantly improved.

Figure 11:
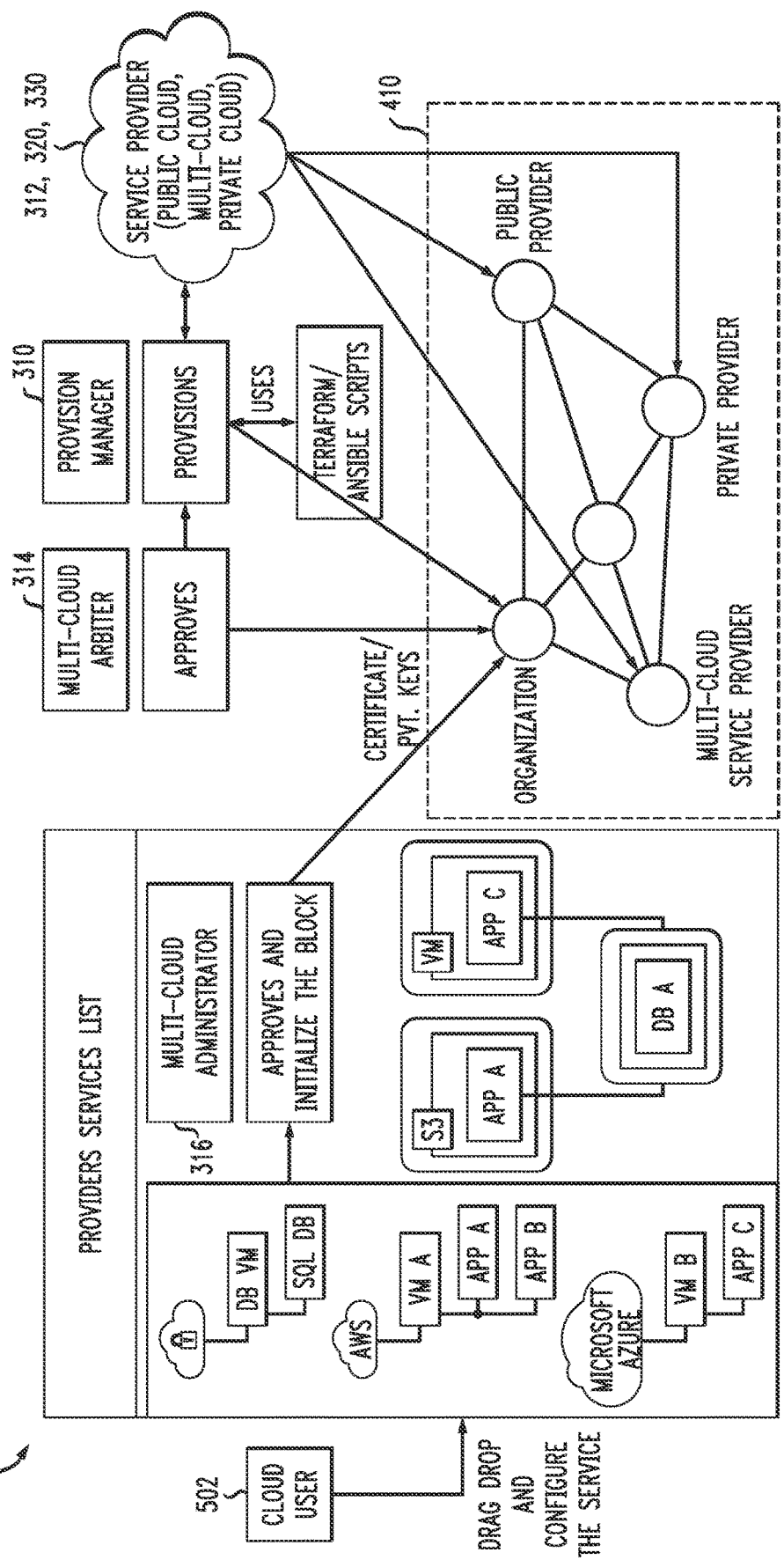
FIG. 11 illustrates a user scenario for a secure multi-cloud management system environment according to an illustrative embodiment.

FIG. 11 illustrates a user scenario 1100 for a secure multi-cloud management system environment according to an illustrative embodiment. As generally depicted in FIG. 11, initializing the request for workload creation/workload management is as straightforward as drag/drop and configuration operations for users. Behind the scenes, temples are generated, and the request goes to multi-cloud administrator 316. After multi-cloud arbiter 314 approval occurs, provision manager 310 initiates the provisioning. In most cases, this can be automated, unless there is a manual approval needed from the provision manager 310. Further, behind the scenes, all required blocks are generated/updated and placed in the blockchain twin architecture according to the stakeholder's consent as described above. The blockchain twin architecture represents all workloads distributed across VM hosted, private cloud, public cloud, and multi-cloud providers. No shadow IT or other users can directly move workloads without stakeholders' consent or bypassing the blockchain twin architecture.

Figure 12:
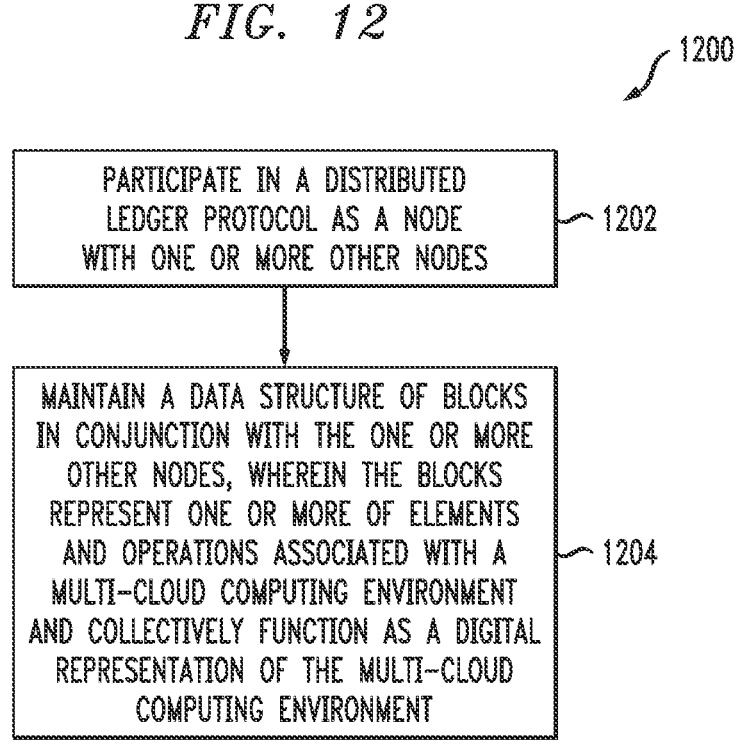
FIG. 12 illustrates a secure multi-cloud management methodology according to an illustrative embodiment.

FIG. 12 illustrates a secure multi-cloud management methodology 1200 according to an illustrative embodiment. It is to be appreciated that, in one or more illustrative embodiments, methodology 1200 can be implemented by all or a subset of the actor/participants described herein in the context of FIG. 3, or as otherwise mentioned herein.

As shown in FIG. 12, step 1202 enables participation in a distributed ledger protocol as a node with one or more other nodes. Recall that the actor/participants described herein in the context of FIG. 3 may each represent at least one node.

Step 1204 enables maintenance, by the node, of a data structure of blocks in conjunction with the one or more other nodes, wherein the blocks represent one or more of elements and operations associated with a multi-cloud computing environment and collectively function as a digital representation of the multi-cloud computing environment.

The term participation or participating in the distributed ledger protocol, as illustratively used herein, refers to steps, actions, and/or functions executed by the node to enable operations associated with the distributed ledger protocol separate from maintaining of the data structure of blocks. Illustrative embodiments are not limited to any specific participating operations but, by way of example only, may comprise communicating with other nodes, authorizing or declining additions or other changes to the data structure of block, generating, deploying and moving workloads, and other management operations. The term maintaining the data structure of blocks, as illustratively used herein, refers to steps, actions, and/or functions executed by the node to make additions or other changes to the data structure of blocks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for secure multi-cloud management will now be described in greater detail with reference to FIGS. 13 and 14. It is to be appreciated that systems and processes described in the context of FIGS. 1-12 can be performed via the platforms in FIGS. 13 and/or 14 but may also be implemented, in whole or in part, in other information processing systems in other embodiments.

Figure 13:
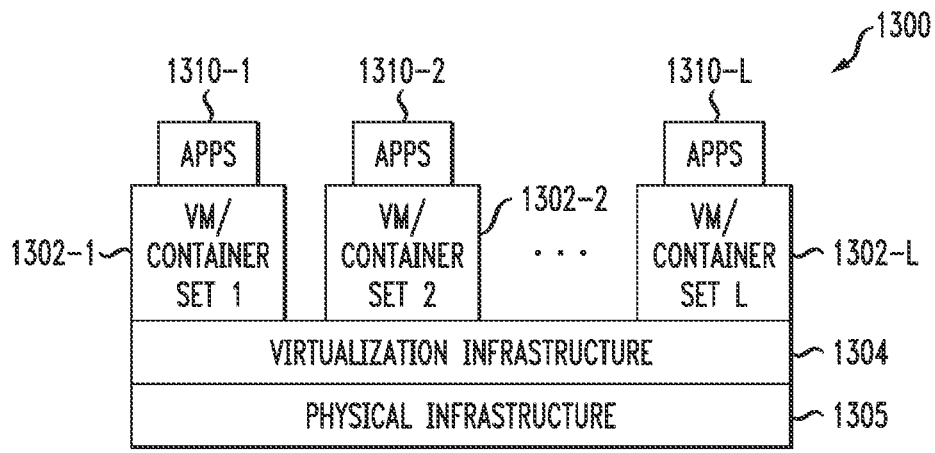
FIGS. 13 and 14 respectively illustrate examples of processing platforms that may be utilized to implement at least a portion of an information processing system with a secure multi-cloud management system environment according to one or more illustrative embodiments.
Figure 14:
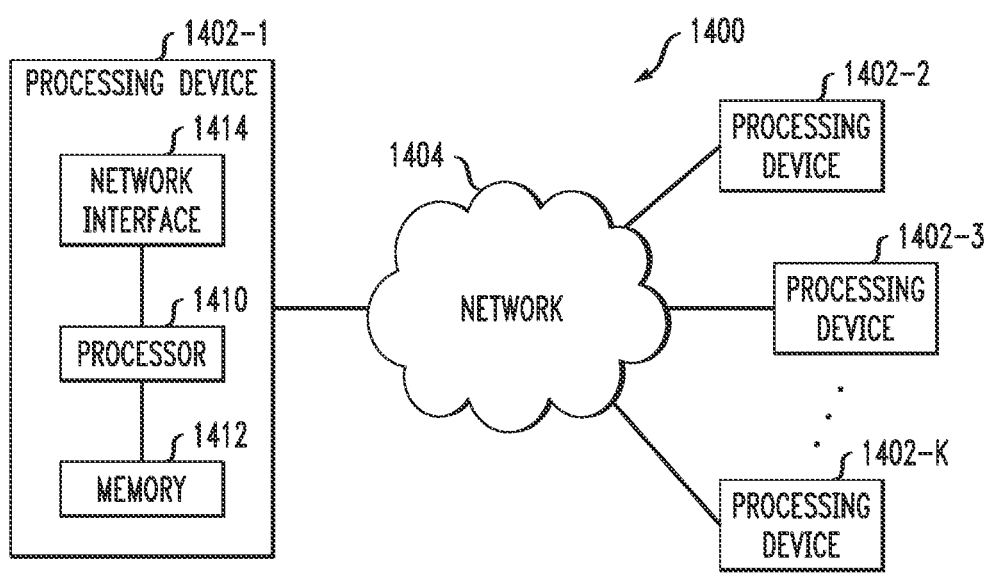

FIG. 13 shows an example processing platform comprising cloud infrastructure 1300. The cloud infrastructure 1300 comprises a combination of physical and virtual processing resources that may be utilized to implement at least a portion of the information processing systems described herein. The cloud infrastructure 1300 comprises multiple VM/container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure.

The cloud infrastructure 1300 further comprises sets of applications 1310-1, 1310-2, 1310-L running on respective ones of the VM/container sets 1302-1, 1302-2, . . . 1302-L under the control of the virtualization infrastructure 1304. The VM/container sets 1302 may comprise respective sets of one or more containers.

In some implementations of the FIG. 13 embodiment, the VM/container sets 1302 comprise respective containers implemented using virtualization infrastructure 1304 that provides operating system level virtualization functionality, such as support for Kubernetes-managed containers.

As is apparent from the above, one or more of the processing modules or other elements or components of system environment 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system environment 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system environment 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, cloud platforms, cloud services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processor coupled to at least one memory, the at least one processor, when executing program code, is configured to:
participate in a distributed ledger protocol as a node with one or more other nodes;
maintain, in conjunction with the one or more other nodes, a data structure of blocks comprising at least a parent block and one or more child blocks associated with the parent block, wherein the blocks represent one or more of elements and operations associated with a multi-cloud computing environment and collectively function as a digital representation of the multi-cloud computing environment; and
obtain a workload to be executed by a first service and a second service which is different from the first service, within the multi-cloud computing environment, wherein:
the parent block is associated with the obtained workload;
the data structure of blocks comprises individual child block chains associated with the parent block; and
the individual child block chains comprise a first child block chain which comprises a first sequence of one or more child blocks associated with a first workload executed by the first service, and a second child block chain which comprises a second sequence of one or more child blocks associated with a second workload executed by the second service.

2. The apparatus of claim 1, wherein the multi-cloud computing environment comprises at least one of a multi-cloud service platform and two or more cloud platforms.

3. The apparatus of claim 2, wherein the two or more cloud platforms comprise two or more public clouds, two or more private clouds, or a combination of at least one public cloud and at least one private cloud.

4. The apparatus of claim 1, wherein the at least one processor, when executing program code, is further configured to, in response to a request, participate in establishment of one or more unique identities for one or more services provided within the multi-cloud computing environment.

5. The apparatus of claim 4, wherein each of the one or more unique identities comprises a private cryptographic key, wherein the private cryptographic key is maintained in the data structure of blocks.

6. The apparatus of claim 5, wherein the private cryptographic key is configured to prevent unauthorized access to a corresponding one of the one or more services.

7. The apparatus of claim 4, wherein the at least one processor, when executing program code, is further configured to, in response to establishment of the one or more unique identities for one or more services, participate in obtaining the workload to be executed by the one or more services within the multi-cloud computing environment.

8. The apparatus of claim 7, wherein at least one child block in the first child block chain comprises a use relationship with at least one child block in the second child block chain.

9. The apparatus of claim 7, wherein the at least one processor, when executing program code, is further configured to, in response to obtaining the workload, participate in provisioning of the workload to the one or more services within the multi-cloud computing environment.

10. The apparatus of claim 9, wherein the one or more child blocks respectively represent provisioning the workload to the one or more services within the multi-cloud computing environment.

11. The apparatus of claim 10, wherein the data structure further comprises an attribute representing a relationship between the one or more child blocks with respect to the provisioned workload.

12. The apparatus of claim 9, wherein the at least one processor, when executing program code, is further configured to, in response to provisioning of the workload, participate in moving the workload to execute on another service within the multi-cloud computing environment.

13. The apparatus of claim 12, wherein the data structure comprises one or more blocks representing movement of the workload to the other service within the multi-cloud computing environment.

14. The apparatus of claim 1, wherein the at least one processor, when executing program code, is further configured to provide an interface for presenting the data structure of blocks to enable an end-to-end view of a workload within the multi-cloud computing environment.

15. A method comprising:
   participating, by a node, in a distributed ledger protocol with one or more other nodes;
   maintaining, by the node, in conjunction with the one or more other nodes, a data structure of blocks comprising at least a parent block and one or more child blocks associated with the parent block, wherein the blocks represent one or more of elements and operations associated with a multi-cloud computing environment and collectively function as a digital representation of the multi-cloud computing environment; and
   obtaining a workload to be executed by a first service and a second service which is different from the first service, within the multi-cloud computing environment, wherein:
   the parent block is associated with the obtained workload;
   the data structure of blocks comprises individual child block chains associated with the parent block;
   the individual child block chains comprise a first child block chain which comprises a first sequence of one or more child blocks associated with a first workload executed by the first service, and a second child block chain which comprises a second sequence of one or more child blocks associated with a second workload executed by the second service; and
   the node comprises at least one processor coupled to at least one memory such that the at least one processor, when executing program code, performs the participating, maintaining, and obtaining steps.

16. The method of claim 15, wherein the multi-cloud computing environment comprises at least one of a multi-cloud service platform and two or more cloud platforms.

17. The method of claim 15, wherein the node participates in one or more of:
   establishing one or more unique identities for one or more services provided within the multi-cloud computing environment;
   provisioning the workload to the one or more services within the multi-cloud computing environment; and
   moving the workload to execute on another service within the multi-cloud computing environment.

18. A computer program product comprising a non-transitory processor-readable storage medium having stored therein program code of one or more software programs, wherein the program code, when executed by at least one processor, causes the at least one processor to:
   participate in a distributed ledger protocol as a node with one or more other nodes;
   maintain, in conjunction with the one or more other nodes, a data structure of blocks comprising at least a parent block and one or more child blocks associated with the parent block, wherein the blocks represent one or more of elements and operations associated with a multi-cloud computing environment and collectively function as a digital representation of the multi-cloud computing environment; and
   obtain a workload to be executed by a first service and a second service which is different from the first service, within the multi-cloud computing environment, wherein:
   the parent block is associated with the obtained workload;
   the data structure of blocks comprises individual child block chains associated with the parent block; and
   the individual child block chains comprise a first child block chain which comprises a first sequence of one or more child blocks associated with a first workload executed by the first service, and a second child block chain which comprises a second sequence of one or more child blocks associated with a second workload executed by the second service.

19. The computer program product of claim 18, wherein the multi-cloud computing environment comprises at least one of a multi-cloud service platform and two or more cloud platforms.

20. The computer program product of claim 18, wherein the program code, when executed by at least one processor, causes the at least one processor to:
   participate in establishment of one or more unique identities for one or more services provided within the multi-cloud computing environment;
   participate in provisioning of the workload to the one or more services within the multi-cloud computing environment; and
   participate in movement of the workload to execute on another service within the multi-cloud computing environment.

* * * * *